US009785390B2

(12) United States Patent
Li et al.

(10) Patent No.: US 9,785,390 B2
(45) Date of Patent: Oct. 10, 2017

(54) PRINTER HAVING GLOBAL SUBSTITUTION LIST

(71) Applicants: Hong Li, Superior, CO (US); Kenneth Stuart Shouldice, Firestone, CO (US); John Thomas Varga, Longmont, CO (US)

(72) Inventors: Hong Li, Superior, CO (US); Kenneth Stuart Shouldice, Firestone, CO (US); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/490,972

(22) Filed: Sep. 19, 2014

(65) Prior Publication Data
US 2016/0085492 A1    Mar. 24, 2016

(51) Int. Cl.
*G06F 3/12* (2006.01)
*G06K 15/02* (2006.01)

(52) U.S. Cl.
CPC .......... *G06F 3/1258* (2013.01); *G06F 3/1205* (2013.01); *G06F 3/1208* (2013.01); *G06F 3/1257* (2013.01); *G06K 15/1809* (2013.01)

(58) Field of Classification Search
None
See application file for complete search history.

(56) References Cited

U.S. PATENT DOCUMENTS

| | | | |
|---|---|---|---|
| 7,050,626 B2 | 5/2006 | Kawakami | |
| 7,751,085 B2 | 7/2010 | Yabe | |
| 8,259,373 B2 | 9/2012 | Jung | |
| 8,610,952 B2 * | 12/2013 | Fukuda | H04N 1/6033 358/1.1 |
| 2003/0117639 A1 * | 6/2003 | Milton | G06K 15/02 358/1.13 |
| 2004/0066524 A1 * | 4/2004 | Lay | G06F 3/1205 358/1.6 |
| 2004/0190057 A1 * | 9/2004 | Takahashi | G06F 3/1205 358/1.15 |

(Continued)

OTHER PUBLICATIONS

Fiery GA-1310, Color Printing, "http://www.kyoceradocumentsolutions.eu/dlc/eu/documentation/usermanual/color", May 5, 2009, 108 pages.

(Continued)

*Primary Examiner* — Marcus T Riley
(74) *Attorney, Agent, or Firm* — Alpine Technology Law Group LLC (57) ABSTRACT

A printer is described. The printer includes a processor. A memory is coupled to the processor. The memory contains instructions that when processed by the processor cause a method to be performed. The method includes presenting a list of printing substitutions on a display. The printing substitutions are each associated with a respective printer profile. The list of printing substitutions identify which ones of the printing substitutions are enabled and which ones of the printing substitutions are disabled. The list also identifies the printer profiles that the substitutions are associated with, wherein at least one printer profile that is not enabled for a current print job is included in the list.

20 Claims, 6 Drawing Sheets

(56) References Cited

U.S. PATENT DOCUMENTS

| | | | |
|---|---|---|---|
| 2005/0134881 A1* | 6/2005 | Nishide | G06K 15/02 |
| | | | 358/1.9 |
| 2005/0206925 A1* | 9/2005 | Agehama | G06K 15/02 |
| | | | 358/1.9 |
| 2006/0170993 A1 | 8/2006 | Jacob | |
| 2008/0137137 A1* | 6/2008 | Yamada | H04N 1/00408 |
| | | | 358/1.15 |
| 2009/0103118 A1 | 4/2009 | Sawada | |
| 2009/0310152 A1* | 12/2009 | Roulland | H04N 1/603 |
| | | | 358/1.9 |
| 2011/0273733 A1 | 11/2011 | Moriyama et al. | |
| 2012/0050757 A1* | 3/2012 | Wagner | G06F 3/1208 |
| | | | 358/1.9 |
| 2013/0120774 A1* | 5/2013 | Kouguchi | H04N 1/32128 |
| | | | 358/1.9 |
| 2013/0279958 A1 | 10/2013 | Yukie et al. | |
| 2016/0085492 A1* | 3/2016 | Li | G06F 3/1258 |
| | | | 358/1.13 |

OTHER PUBLICATIONS

European Search Report, EP15184569, dated Feb. 26, 2016, 8 pages.

* cited by examiner

| COLOR TO SUBSTITUTE FOR (INPUT COLOR) | COLOR TO SUBSTITUTE FOR (OUTPUT COLOR) |
|---|---|
| GRAY (0) | CMYK(255,0,0,0) |
| GRAY (200) | CMYK(255,255,0,0) |
| RGB (147,50,120) | CMYK(0,128,128,0) |
| RGB (147,0,120) | CMYK(255,0,255,0) |
| CMYK(255,0,0,0) | CMYK(0,0,255,0) |

FIG. 1
(PRIOR ART)

| COLOR TO SUBSTITUTE FOR (INPUT COLOR) | COLOR TO SUBSTITUTE FOR (OUTPUT COLOR) | ENABLED/ DISABLED | PROFILE |
|---|---|---|---|
| GRAY (Ø) | CMYK(255,0,0,0) | Y | MATTE PAPER |
| GRAY (200) | CMYK(255,255,0,0) | N | ALL |
| RGB (147,50,120) | CMYK(0,128,128,0) | Y | GLOSS PAPER |
| RGB (147,0,120) | CMYK(255,0,255,0) | N | 1:00 - 5:00 PM |
| CMYK(255,0,0,0) | CMYK(0,0,255,0) | Y | MATTE PAPER |

PRINTER HAVING GLOBAL SUBSTITUTION LIST

FIELD OF INVENTION

The field of invention relates to printer technology generally, and, more specifically, to a printer having a global substitution list.

BACKGROUND

A modern day printer is typically connected to multiple client devices (e.g., computers) through a network. The client devices have applications (e.g., word processing applications, spreadsheet applications, graphic art applications, etc.) and (typically) device drivers that enable the work product of the applications to be printed on the printer. The printing of such a work product on a printer typically involves the passing of a "job ticket" from the client device that generates the work product to the printer.

A job ticket is a high level description of the properties of the print out to be made. A job ticket typically defines the number of physical pages to be printed, whether the print out is to be single sided or double sided, the number of copies, the margins on the pages, the font size of the matter that is printed on the pages, the printer tray that the paper the work product is to be printed on is to be selected from, the paper bin that the finished printout is to be binned into and any post-processing procedures (e.g., collation, stapling, punching, folding, etc.). Many job tickets are written according to the Job Definition Format (JDF) standard published by CPI4 (the International Cooperation for the Integration of Processes in Prepress, Press and PostPress Organization). The JDF specification provides for the definition of parameters like those just mentioned above in an XML format.

Modern day printers also include one or more processors and associated memory to store and execute program code locally on the printer. Much of this software is used to control the internal operations of the printer. One such control operation is to expand the job ticket into a "print job". A print job is a "sheet-by-sheet" specification of the matter to be printed. A sheet includes a corpus of information used by the printer to print a physical piece of paper according to the job ticket. There is typically one sheet per physical piece of paper that is printed irrespective of whether the piece of paper is printed single sided ("a page per sheet") or double-sided ("two pages per sheet").

Thus whereas a JDF job ticket describes the print out more generally, the "print-job" is akin to a collection of data sheets that is created to separately define the characteristics of each of the printed pieces of paper of the document.

For example, if a first chapter of a document is to be printed on yellow paper in 12 point font and a second chapter of a document is to be printed on blue paper in 14 point font, the JDF job ticket might specify the range of the first chapter and that the pages within this range are to be printed from the tray having yellow paper in 12 point font as well as the range of the second chapter and that the pages within this range are to be printed from the tray having blue paper in 14 point font.

When the printer receives the JDF job ticket it essentially forms the print job by creating a separate sheet for every piece of paper to be printed out and storing these sheets in memory. Thus, there will be stored in memory separate sheets for every page of the first chapter and separate sheets for every page of the second chapter. While the printer is in the act of printing the document, it refers to the sheets (e.g., in sequence) to understand the properties that the corresponding physical pieces of paper are to be printed.

A feature of prior art document printing concerns the use of an "input profile", a "printer profile" and "profile connection space" (PCS). Consider an example were a user wants to print a picture taken with a digital camera. After the picture is taken with the camera, the digital image from the camera is processed with an input profile for the camera. The input profile may characterize various imperfections in the camera such as "true red" being recorded by the camera as something more like "orange-red". As such, the input profile for the camera is used to convert the "orange-red" components of the digital image into "true red" in PCS. That it, PCS attempts to describe the picture as if it were taken by a perfect camera.

In order to print the picture, the PCS version of the image is processed by an output profile for the printer. Here, the printer can have imperfections similar to the camera. For example, the printer may print "true-red" that is viewed by the human eye as something more like "yellow-red" when printed on a particular type of paper and viewed under a certain view condition (a view condition basically describes the conditions under which the printed image will be viewed (e.g., in a room lit with a light bulb, outdoors in sunlight, etc.)). Similar to the input profile, a printer profile is used to convert the image from PCS space into final color values, e.g., CMYK color information that is properly adjusted to print something closer to actual red.

The printer profile for this example specifies the specific pixel values that correspond to "true red" as well as the pixel values for the "new" color that are to be printed in place of true red to correct for the deficiency of the printer (e.g., pixel values for a shade of "pink-red"). The description for this particular printer profile therefore includes: 1) the new pixel values to be switched in (e.g., "pink-red"); 2) the pixel values to be switched out (e.g., "true-red"); 3) the condition that triggers the substitution effect (e.g., the particular type of paper and view condition that causes "true-red" to be printed as "yellow-red"). Typically, a printer profile specifies more operations than just a single color change as described in the simple example above.

As large printer systems are complex, it is not uncommon for a user to desire a change to be made to a printer profile. For example, a user may recognize a situation where the printer profile itself does not accurately print all the colors it is intended to print. In this case, the user applies a "substitution" to the printer profile. Continuing with the above example where the printer profile changed an input color of "true red" from PCS space to output color of "pink-red", a user may recognize a situation where this particular change of colors is not appropriate (e.g., because the printer presently has another imperfection that the current printer profile does not fully address). As such, the user may now desire that the printer attempt to print "purple-red" for input pixel values specified as "true red" from PCS space.

As such, the user specifies a "color substitution" to the printer profile that indicates "true-red" from PCS space is to be printed as "purple-red" rather than "pink-red" (the later being what the profile specifies should be printed). The implementation of the substitution can be viewed as intercepting the "true-red" color from PCS, by-passing the printer profile for the "true-red" color and instead specifying "purple-red" directly from the substitution.

A single printer can possess a number of different profiles that can be used for any particular job. According to one approach, "color management space" is a user environment in which a user selects printer profiles to be used (e.g., for a specific job, over for the life of the printer, etc.). A problem, however, is that no convenient, organized way of presenting the corpus of various substitutions that may be made to these profiles currently exists.

FIGURES

A better understanding of the present invention can be obtained from the following detailed description in conjunction with the following drawings, in which.

DETAILED DESCRIPTION

Figure 1:
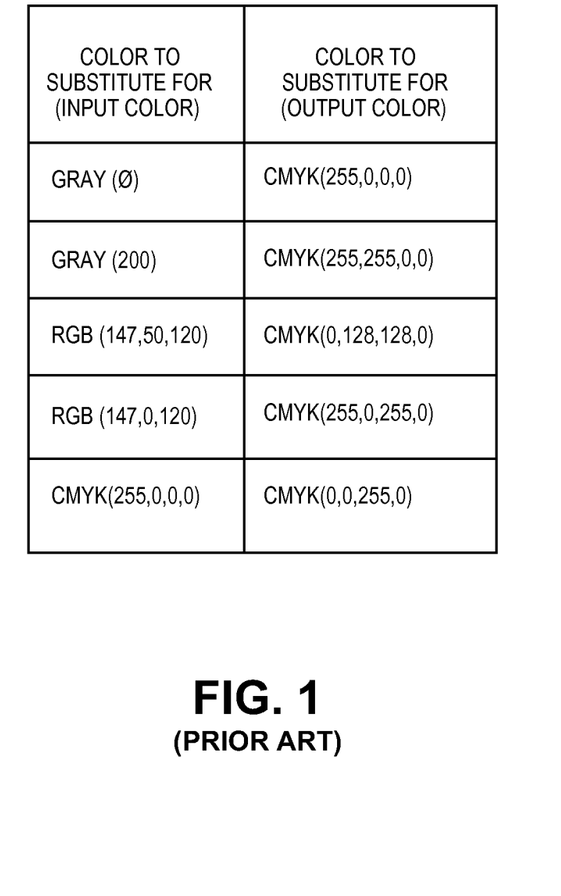
FIG. 1 shows a prior art substitution list.

FIG. 1 shows a prior art table that lists the color substitutions to be made to a number of different printer profiles. The list of substitutions may be presented, for example, on a graphical user interface associated with the printer. As an example of the use of the prior art table of FIG. 1, a user may have a current print job that is active in the printer but desires that a substitution be made to the applicable printer profile(s). The table explicitly lists the substitutions. A problem with the manner in which the prior art substitution table is implemented, however, is that it is too simplistic and restrictive. Specifically, any substitution that is presented on the table is applied to the entire, current print job (i.e., the substitution is applied to every sheet of the print job).

Figure 2:
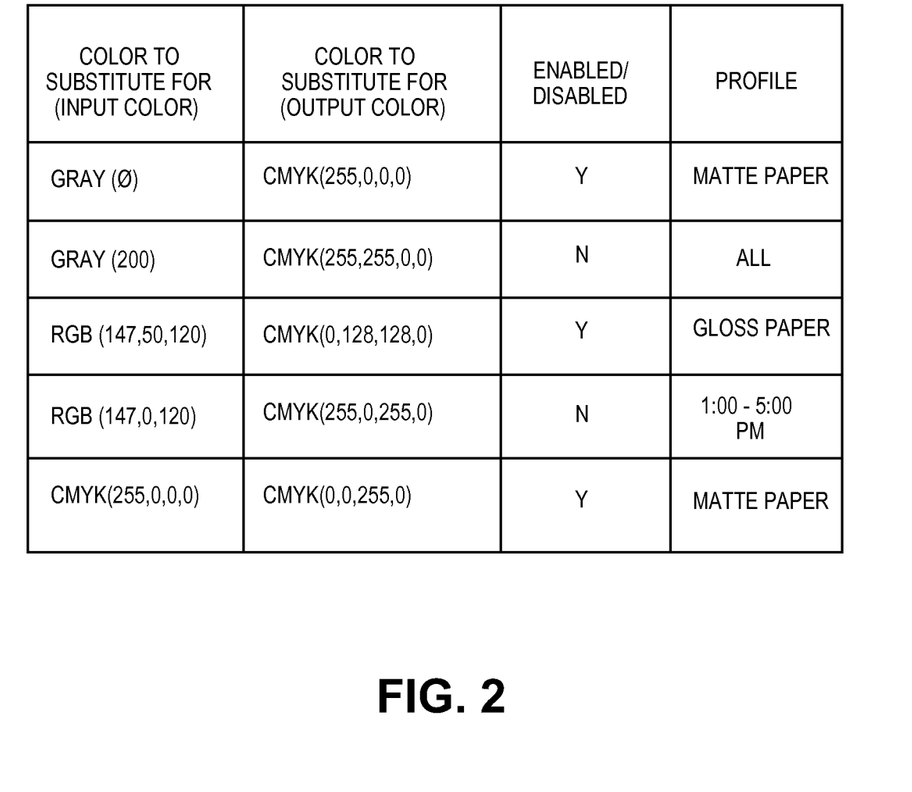
FIG. 2 shows an improved substitution list.

An improved substitution table that may instead be presented on graphical user interface on a display associated with a printer is depicted in FIG. 2. As observed in FIG. 2, the improved substitution table includes the notion of a "status" and a "printer profile" for each substitution entry that is listed in the table. The status component permits substitutions to be enabled/disabled per print job.

Thus, unlike the prior art approach in which only the currently active substitutions were displayed to a user and where any listed substitution was enforced for the current/active print job, the new approach identifies the printer profile and permits specified substitutions to be turned on/turned off as desired for each/any print job.

The identification of the printer profile to which the substitution applies is relevant because printer profile naming nomenclature (i.e., how printer profiles are named) often indicate "the condition" for which the printer profile was originally constructed. For instance, given the imperfections of a printer, a printer may exhibit a first type of imperfection under a first condition, and, exhibit a second kind of imperfection under a second condition. For example a printer may print "true-red" as "yellow-red" on matte paper but also print "true-red" as "orange-red" between the hours of 1:00-5:00 PM. Here, a first profile may be created for the first condition (matter paper) while a second profile may be created for the second condition (printing between 1:00-5:00 PM).

Note that other mechanisms could come into play for a substitution other than an imperfection of the printer. For example, a particular customer (e.g., client ABC) may simply desire that "true-red" be printed as "orange-red" (to purposely change a logo's color scheme). As such, in this case, the second condition/printer profile could just as easily be specified as "client ABC". For simplicity the remainder of the example will assume the condition/profile of 1:00-5:00 PM.

As such, the name of the first printer profile may indicate that it was designed to be applied to matter paper while the name of the second printer profile may indicate that it was designed to be applied during the hours of 1:00-5:00 PM. Even if the nomenclature of the profile names do not give away the conditions associated with their respective profiles, a user may simply memorize which profiles (by name) correspond to which condition. As such, FIG. 2 indicates that the printer profile name is being displayed in the table (under the "profile" column) but for illustrative ease the specific condition for which the profile was created is actually listed. This representation provides the "information" that a user will take from the table.

Thus, in an embodiment, for any substitution that may be made to any printer profile supported by the printer, the display of FIG. 2 provides: 1) the specific substitution; 2) the specific printer profile to which the substitution applies (including associated conditional information associated with the printer profile); and, 3) whether or not the substitution is enabled for the current print job. Displaying substitutions in this manner permits for selective enforcement of displayed substitutions on each/any print job rather than mandatory enforcement of a displayed substitution on every sheet of the current print job.

Here, because a particular profile has an associated condition and the condition itself may be applicable to less than all of the pages of a particular print job, implementing substitutions in this manner has the potential to apply a substitution for only a subset of pages of a particular print job rather than, as in the prior art, all of the pages of the print job (although any profile having a condition that is true for all pages of a print job could also likewise apply for the entirety of the print job (if a substitution for the profile were also enabled)).

Thus the addition of the status and profile/condition components along with their associated substitution in the displayed information corresponds to the presentation of a "global" substitution table that globally lists (e.g., all) possible substitutions to (e.g., all) printer profiles and which may or may not apply for any particular sheet of any/each print job. Again, this stands in stark contrast to the prior art substitution table which only listed substitutions for the current print job and which were applied to every sheet of the print job.

As an example of the improvements relative to the user experience that may be realized with the improved approach, as a point of comparison, with the prior art approach the user had to "build" a complete substitution table for the current print job. Thus, separate tables had to be constructed and kept track of for each different print job. By contrast, with the global substitution list that is realized with the new table, the user may simply enter whatever substitutions are deemed appropriate on a case-by-case basis with each new print job. The table "remembers" each substitution that is entered and can be selectively turned on for each subsequent print job after it is entered.

As an example, if a discovery is made that a printed type of green is not bright enough on a certain type of paper under a certain viewing condition (e.g., indoor lamp light), a substitution may be entered into the table for the profile that is to be used with the certain type of paper to substitute a brighter green for a darker green. Here, the particular type of paper corresponds to the condition of the profile and the use of the lighter green in place of the darker green corresponds to the substitution to be made to the printer profile. If a user were to begin a print job where the print out would be viewed under the viewing condition and would be made on the certain type of paper, the user would likely (via color management space) enable the printer profile that is to be used with the certain type of paper. The user would then likewise also enable on the displayed table the substitution for the profile because the viewing condition is in play.

This same substitution may then easily be made to apply for all following print jobs that use the printer profile simply by keeping it enabled on the table. If the substitution is enabled and a subsequent print job does not use the specific type of paper to which the substitution applied, the substitution would most likely not be implemented because the profile would not be used (as specified via color management space). By contrast, in the prior art approach, a table would have to be separately built for each print job with an effort having to be made by the user for each such print job to recognize whether or not the substitution applied and create an entry on the applicable table if so.

As stated above, the new substitution table of FIG. 2 may be presented on the screen of a printer through a GUI. The ability to scroll through the screen (e.g., to display regions of the table that previously were not visible) may be provided through the GUI. The GUI may also include features (e.g., push-buttons, menus, etc.) to enter/delete entries to/from the table, enable/disable existing entries, specify the printer profile conditions for the entries, etc.

Figure 3:
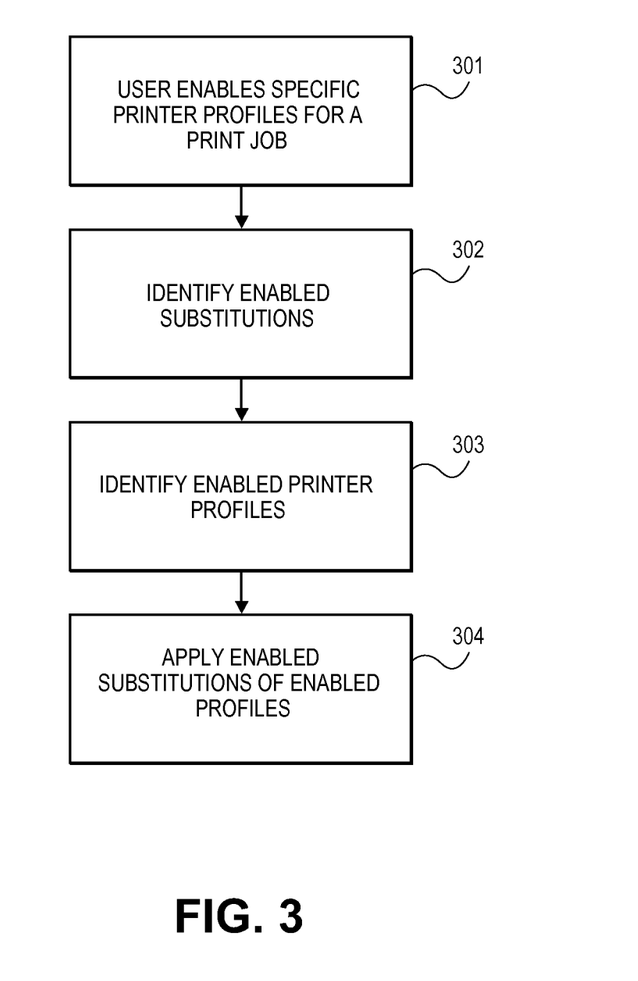
FIG. 3 shows a first method for imposing substitutions.

FIG. 3 shows a process performed by a printer that provides a substitution table as described above with respect to FIG. 2. As observed in FIG. 3, a user enables specific printer profiles for a print job 301. The entries in the global substitution list are then analyzed and any enabled substitutions are flagged 302. The profiles that the enabled substitutions are to be applied to are then compared against the profiles that have been enabled for the print job 303. The enabled substitutions are then applied only to those printer profiles that have been enabled for the print job 304 (e.g., the printer profiles with their enabled substitutions are then applied to the input information to produce the sheets for the print job)

As an example, if the substitution table includes an enabled entry to use a brighter color green instead of a darker color green for a particular printer profile that is to be used when printing on matte type paper, the printer will analyze the job ticket and/or each print job sheet to see if the ticket/sheet describes a printed piece of matte paper. For each sheet for which this condition is true, the profile for matte paper will be used and the substitution will be reflected on the sheet if the printed matter of the sheet also includes the darker green color (if the printed matter does not include the darker green color the substitution can not take effect even if the substitution's condition applies). Here, for example, the color code of the darker green color is literally replaced with the color code for the brighter green color on each sheet.

In one embodiment, the profile column of the display supports the condition "all" which is interpreted to mean that the particular substitution is to be applied to all the printer profiles that have been enabled for the print job (e.g., via color management space).

Possible individual conditions for which a printer profile may be created include but are not limited to: all, gloss paper, matter paper, plain paper, front page of a sheet (front side of media), back page of a sheet (back side of media), the date/time, the location of the printer, the identity of a camera that was used to create an image, the date/time/location that an image was taken with a specific camera, a particular type of object on a page (such as text or line art), a profile that dictates how media on a page having certain characteristics are to be treated (sheet media characteristics profile), a profile that more generally identifies specific user preferences. Any of these may also be combined logically to form more complex profiles (e.g., plain paper AND front page of sheet). As substitutions are made to printer profiles, substitutions may be made to effectively apply to any of these conditions/profiles.

To further elaborate on some of the conditions specified above, the date/time condition may be used in response to the user of a printer noticing the a printer's hardware performance may change as a function of day or time. For example, a printer may be heavily used in the middle of the day but hardly used in the middle of the night. The printer's hardware may be affected by this usage (e.g., colors may be duller during heavy usage in the middle of the day and brighter during sparse usage during the middle of the night). As such, a user may establish a profile based on time of day to introduce brighter colors during the middle of the day to compensate for the duller printouts that would otherwise result. Substitutions to the profile may be applied as appropriate by enabling them on the global substitution list. For example, a user may choose to enable a first substitution that imposes even brighter colors if the printer usage is especially heavy or choose to enable a second substitution that imposes less bright colors if the printer usage is heavy but not as heavy as usual.

A profile may also defined for application to a particular type of object on a page (e.g., particular text, text in particular font, a particular image, particular line art, etc.,).

Possible specific substitutions to be specified for a particular substitution entry on the new global table include but are not limited to the following: substitute any specific color (e.g., as defined from a cyan/magenta/yellow/black color scale or a red/green/blue color scale or gray color scale) that is to be substituted for any other specific color, substitute a specific item of printed substance (e.g., a specific image, specific text, specific line art) with any other specific item of printed substance, etc.

Note that the above list includes substitution definitions other than color substitutions. Although color substitutions may be more common, to the extent the printer can control the printing of any image or other printer matter (e.g., text, line art, etc.) these same features can likewise be included in substitutions schemes no differently than color substitutions. In the case of a text substitution, any text characteristic may be substituted for any other text characteristic.

Text characteristics include but are not limited to: the font type (e.g., Times New Roman, Palatino, Arial, Calibri, Cambria, etc.), the font size (e.g., 6 to 24 point font in one point increments) and the font style (e.g., any combination of bold, underlined, italicized, superscript, subscript, etc.). Thus, for example, in the case of a printer having a built-in page formatter at least, one substitution may specify for its profile condition that 12 point Cambria non-bold font is to be substituted with 24 point Calibri bold font.

Similarly, any line art feature can be substituted with any other line art feature. Line art features include but are not limited to: the size of the line (line thickness), the structure of the line (solid, dashed, dotted, dashed and dotted, etc.), the presence of arrows or lack thereof at each line end, etc. Thus, for example, one substitution may specify for its profile condition that a dashed line without any arrows could be substituted by a bold line with arrows at both ends.

Figure 4:
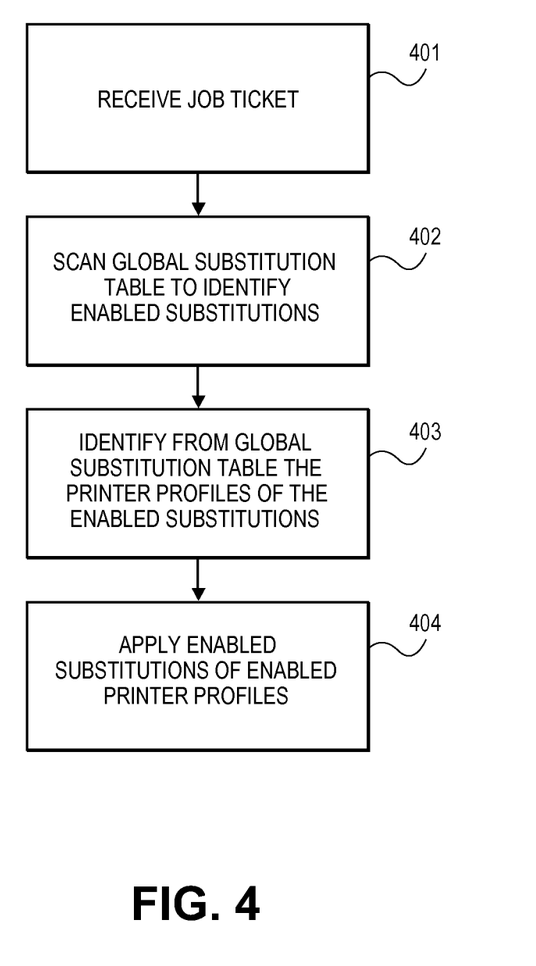
FIG. 4 shows a second method for imposing substitutions.

FIG. 4 shows a background process of a graphical user interface that can be performed by a printer having a global substitution list as described above. According to the process of FIG. 4, the printer receives a job ticket or other set of input information that defines a printing effort that it to take place 401. The printer scans the global substitution table to define the set of enabled substitutions 402. Once the set of enabled substitutions are understood, the printer identifies from the global substitution table which ones of the enabled substitutions are for a printer profile that has been enabled for the current print job 403. Any enabled substitution of an enabled printer profile is applied when the printer profile is applied to the processing of the print job 404.

Figure 5:
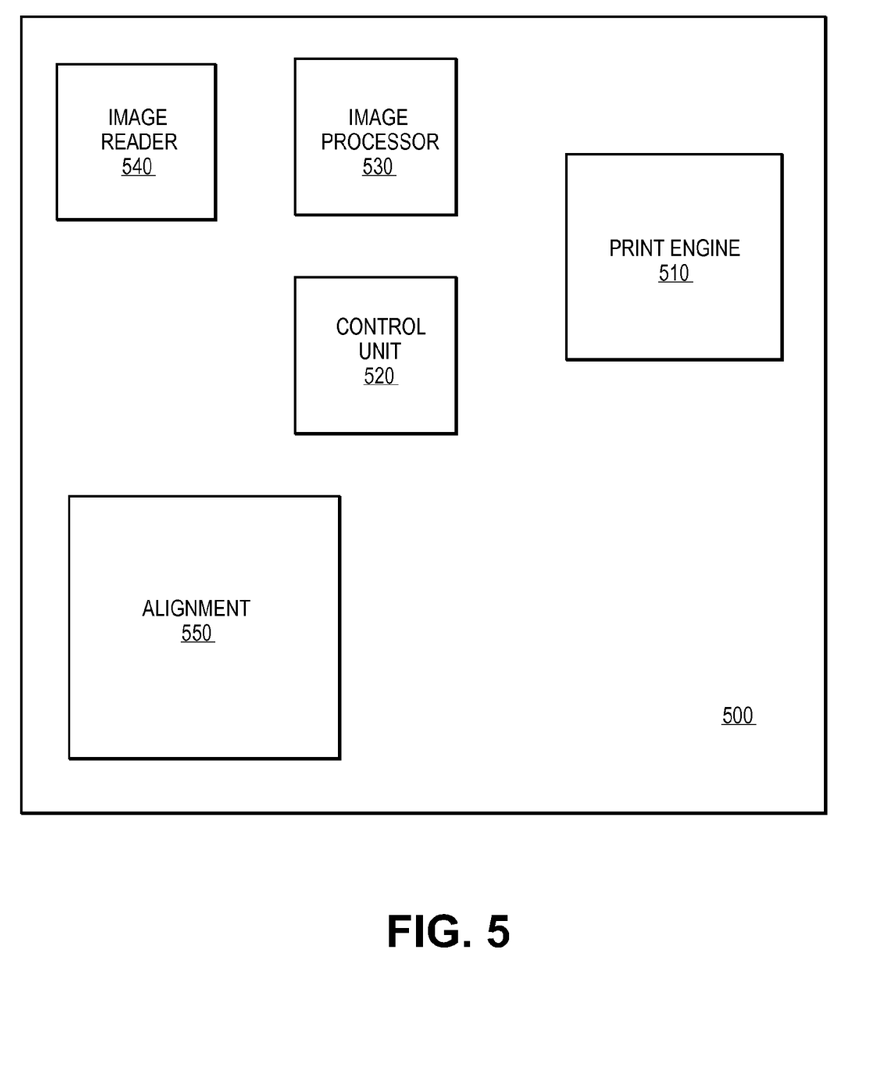
FIG. 5 shows a diagram of a printer.

FIG. 5 illustrates one embodiment of a printer 500. Printer 500 includes print engine 510, control unit 520, image processor 530, and image reader 540. Print engine 510 includes the print heads that apply ink to a print medium (e.g., paper). In one embodiment, print engine 510 includes at least four print heads arranged in a fixed inkjet print head array. In a further embodiment, print heads associated with a single color are located within the same print head tray.

The global substitution table discussed above may be presented on a display screen 560 that is coupled to the control unit 520. The control unit 520 may be implemented, wholly or partially, as a processor or other kind of circuit that executes program code. Memory may be coupled to a processor associated with the control unit 520. The control unit 520 and the image processor 530 may perform various sequences of the processes described above with the control unit 520 tending to perform more higher level functions such as the display of the global substitution table and its background processes and the image processor performing more lower level functions such as the actual substitutions.

Control unit 520 controls the operation of print engine 510, while image processor 530 performs rasterization of image data received at printer 500. Rasterization converts information received at printer 500 into a raster format. Particularly, image processor 530 generates a raster scan of a received image that is to be stored as scan line data in a memory array. Subsequently, image processor 530 performs halftone processing of the scan line data stored in the memory array. Control unit 520 also verifies the output of print engine 510 upon receiving image data captured by image reader 540.

Printer 500 also includes a print head alignment system 550. Alignment system 550 is implemented to provide an alignment of print engine 510 associated with each individual ink color with respect to a reference position. In a further embodiment, alignment system 550 provides a framework for computing a magnitude of misalignment between print heads in fixed print head array arrangements. Although shown as residing a component of printer 500, other embodiments may feature alignment system 550 as an independent device, or combination of devices, that is communicably coupled to printer 500. Various fixes to problems exhibited by the aforementioned printouts my be addressed via manipulation of the alignment system 550.

Control unit 520 may be implemented as a form of computing system having a central processing unit and associated system memory and non volatile storage. An exemplary computing system is depicted in FIG. 5. Control unit 520 may include various components of the computing system of FIG. 5.

Figure 6:
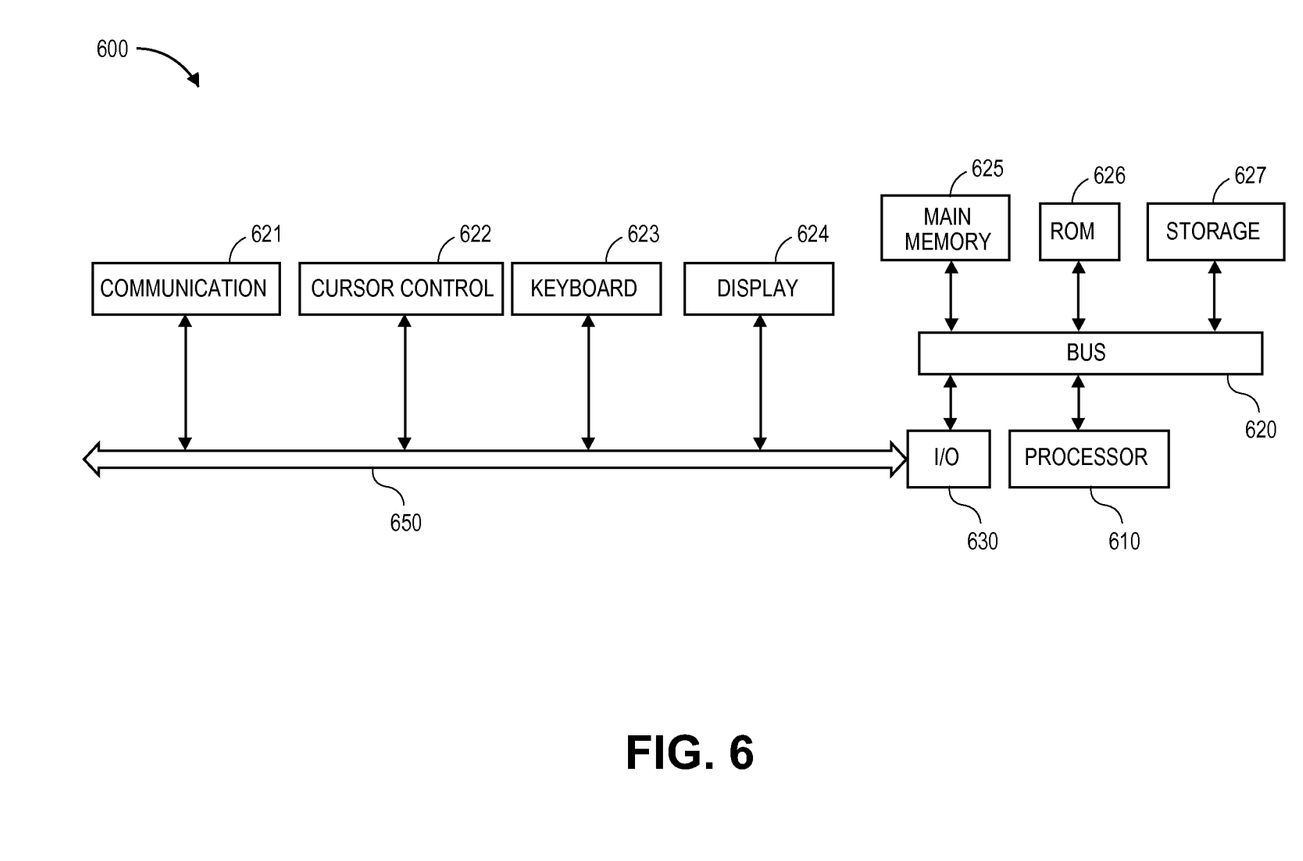
FIG. 6 shows a diagram of a computing system.

FIG. 6 illustrates a computer system 600. Computer system 600 may partially or wholly found within, for example, either or both of control unit 520 and image processor 530 of FIG. 5. Computer system 600 includes a system bus 620 for communicating information, and a processor 610 coupled to bus 620 for processing information.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and or other static storage device 626 coupled to bus 620 for storing static information and instructions used by processor 610.

A data storage device 625 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624, an input device (e.g., an alphanumeric input device 623 and or a cursor control device 622). The communication device 621 is for accessing other computers (servers or clients). The communication device 621 may comprise a modem, a network interface card, or other well-known interface device, such as those used for coupling to Ethernet, token ring, or other types of networks.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions. Program code may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

The invention claimed is:

1. An apparatus, comprising:
a processor;
memory coupled to the processor, the memory containing instructions that when processed by the processor are operable to cause a method to be performed, the method comprising:

presenting a list of printing substitutions on a display, including:
a first printer profile having a first identifier identifying a first print condition under which to substitute a color from an input color space to an output color space and an indication as to whether the first printer profile is enabled; and
a second printer profile having a second identifier identifying a second print condition under which to substitute a color from the input color space to the output color space and an indication as to whether the second printer profile is enabled,
wherein the first identifier indicates that the first print condition is applicable to only the first printer profile and the second identifier indicates that the second print condition is applicable to both the first printer profile and the second printer profile.

2. The apparatus of claim 1 wherein the printing substitutions are analyzed for a true print condition for each page of a sheet.

3. The apparatus of claim 1 wherein the method further comprises permitting a user to enable and disable printing substitutions.

4. The apparatus of claim 1 wherein the method further comprises:
processing a first print job at the processor including incorporating the printing substitutions that are enabled and whose printer profiles are also enabled for the first print job.

5. The apparatus of claim 4, wherein the method further comprises:
presenting the list of printing substitutions on the display after processing the first print job; and
processing a second print job at the processor including incorporating the printing substitutions that are enabled and whose printer profiles are also enabled for the second print job.

6. The apparatus of claim 4 wherein the processing includes compiling a job ticket into a series of sheets, each sheet representative of a piece of paper to be printed out.

7. The apparatus of claim 1 wherein the list of printing substitutions includes a third printer profile, comprising at least one of:
a color management profile;
a front side of media profile;
a back side of media profile;
a text type of object profile;
a line art type of object profile;
a sheet media characteristics profile;
a user preferences profile.

8. A non-transitory machine readable medium containing instructions that when processed by a processor are operable to cause a method to be performed, the method comprising:
presenting a list of printing substitutions on a display, including:
a first printer profile having a first identifier identifying a first print condition under which to substitute a color from an input color space to an output color space and an indication as to whether the first printer profile is enabled; and
a second printer profile having a second identifier identifying a second print condition under which to substitute a color from the input color space to the output color space and an indication as to whether the second printer profile is enabled,
wherein the first identifier indicates that the first print condition is applicable to only the first printer profile and the second identifier indicates that the second print condition is applicable to both the first printer profile and the second printer profile.

9. The machine readable medium of claim 8 wherein the printing substitutions are analyzed for a true print condition for each page of a sheet.

10. The machine readable medium of claim 8 wherein the method further comprises permitting a user to enable at least one of disabled printing substitutions.

11. The machine readable medium of claim 8 wherein the method further comprises:
processing a first print job at the processor including incorporating the printing substitutions that are enabled and whose printer profiles are also enabled for the first print job.

12. The machine readable medium of claim 11, wherein the method further comprises:
presenting the list of printing substitutions on the display after processing the first print job; and
processing a second print job at the processor including incorporating the printing substitutions that are enabled and whose printer profiles are also enabled for the second print job.

13. The machine readable medium of claim 11 wherein the processing includes compiling a job ticket into a series of sheets, each sheet representative of a piece of paper to be printed out.

14. The machine readable medium of claim 8 wherein the list of printing substitutions includes a third printer profile, comprising at least one of:
a color management profile;
a front side of media profile;
a back side of media profile;
a text type of object profile;
a line art type of object profile;
a sheet media characteristics profile;
a user preferences profile.

15. A method, comprising:
presenting a list of printing substitutions on a display, including:
a first printer profile having a first identifier identifying a first print condition under which to substitute a color from an input color space to an output color space and an indication as to whether the first printer profile is enabled; and
a second printer profile having a second identifier identifying a second print condition under which to substitute a color from the input color space to the output color space and an indication as to whether the second printer profile is enabled;
wherein the first identifier indicates that the first print condition is applicable to only the first printer profile and the second identifier indicates that the second print condition is applicable to both the first printer profile and the second printer profile.

16. The method of claim 15 wherein the printing substitutions are analyzed for a true print condition for each page of a sheet.

17. The method of claim 15 wherein the method further comprises permitting a user to enable at least one of the disabled printing substitutions.

18. The method of claim 15 wherein the method further comprises:
processing a first print job including incorporating the printing substitutions that are enabled and whose printer profiles are also enabled for the first print job.

19. The method of claim 18, wherein the method further comprises:
   presenting the list of printing substitutions on the display after processing the first print job; and
   processing a second print job including incorporating the substitutions that are enabled and whose printer profiles are also enabled for the second print job.

20. The method of claim 18 wherein the processing includes compiling a job ticket into a series of sheets, each sheet representative of a piece of paper to be printed out.

* * * * *